United States Patent
Shah et al.

(10) Patent No.: US 11,089,108 B2
(45) Date of Patent: Aug. 10, 2021

(54) METHOD AND SYSTEM FOR ANOMALY DETECTION, MISSING DATA IMPUTATION AND CONSUMPTION PREDICTION IN ENERGY DATA

(71) Applicant: Tata Consultancy Services Limited, Mumbai (IN)

(72) Inventors: Pranav Champaklal Shah, Mumbai (IN); Rekha Vaidyanathan, Mumbai (IN); Suman Datta, Kolkata (IN); Suvra Dutta, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 771 days.

(21) Appl. No.: 15/924,908

(22) Filed: Mar. 19, 2018

(65) Prior Publication Data

US 2018/0270312 A1    Sep. 20, 2018

(30) Foreign Application Priority Data

Mar. 18, 2017  (IN) .............................. 201721009472

(51) Int. Cl.
*G06F 15/16* (2006.01)
*H04L 29/08* (2006.01)
(Continued)

(52) U.S. Cl.
CPC .......... *H04L 67/125* (2013.01); *G05B 13/048* (2013.01); *G06N 20/00* (2019.01);
(Continued)

(58) Field of Classification Search
CPC ... H04L 67/125; H04L 63/1425; G06N 20/00; G05B 13/048; G06Q 10/04
See application file for complete search history.

(56) References Cited

U.S. PATENT DOCUMENTS

2003/0101009 A1  5/2003  Seem
2014/0006330 A1  1/2014  Biem
(Continued)

FOREIGN PATENT DOCUMENTS

JP       2003242212      8/2003
WO    WO-2006/044035    4/2006

OTHER PUBLICATIONS

Eisses, J. (Jun. 2014). Anomaly detection in electricity consumption data of buildings using predictive models (Bachelor's thesis for Artificial Intelligence). Retrieved from https://esc.fnwi.uva.nl/thesis/centraal/files/f1945106686.
(Continued)

*Primary Examiner* — Ryan J Jakovac
(74) *Attorney, Agent, or Firm* — Finnegan, Henderson, Farabow, Garrett & Dunner, LLP (57) ABSTRACT

The present application provides a method and system for outlier detection, anomalous behavior detection, missing data imputation and prediction of consumption in energy data for one or more energy sensors by using a unified model. The application discloses a data collection module for collect a time series data to be used as training data, a model training module for training the unified model using the collected time series data to enable computation of a plurality of parameters, and a model implementation module for implementing, by the trained unified model, the plurality of parameters on a new data of energy consumption wherein the plurality of parameters are used perform at least one from a group of outlier detection, anomaly detection, missing data imputation and prediction of consumption in energy data.

14 Claims, 6 Drawing Sheets

(51) Int. Cl.
  *G05B 13/04* (2006.01)
  *H04L 29/06* (2006.01)
  *G06N 20/00* (2019.01)
  *G06Q 10/04* (2012.01)
  *G06F 16/28* (2019.01)
(52) U.S. Cl.
  CPC ......... *G06Q 10/04* (2013.01); *H04L 63/1425* (2013.01); *G06F 16/285* (2019.01)

(56) References Cited

U.S. PATENT DOCUMENTS

| | | |
|---|---|---|
| 2014/0088781 A1 | 3/2014 | Kearns et al. |
| 2015/0112900 A1* | 4/2015 | Ariyoshi ................ G06N 20/00 706/12 |
| 2016/0012340 A1* | 1/2016 | Georgescu ............. G06Q 10/04 700/276 |
| 2018/0219889 A1* | 8/2018 | Oliner ...................... G06N 3/04 |

OTHER PUBLICATIONS

Araya, D.B. et al. "Collective Contextual Anomaly Detection Framework for Smart Buildings," *2016 International Joint Conference on Neural Networks (IJCNN)*, Vancouver, Canada, Jul. 24-29, 2016, 8 pages.

* cited by examiner

METHOD AND SYSTEM FOR ANOMALY DETECTION, MISSING DATA IMPUTATION AND CONSUMPTION PREDICTION IN ENERGY DATA

PRIORITY CLAIM

This U.S. patent application claims priority under 35 U.S.C. § 119 to: India Application No. 201721009472, filed on Mar. 18, 2017. The entire contents of the aforementioned application are incorporated herein by reference.

TECHNICAL FIELD

The present application generally relates to energy data prediction. Particularly, the application provides a method and system for outlier detection, anomalous behavior detection, missing data imputation and prediction of consumption in energy data for one or more energy sensors by using a unified model.

BACKGROUND

In the IoT world, where data is often captured at high frequency, decisions are made based on changing information or conditions that can be critical to the system. Due to the geographically spread-out infrastructure and multiple points of potential failure, consistent, complete and correct availability of data is a challenge.

Specifically, in the Energy Management Domain, the problem of Remote Monitoring and Optimization of Energy Consumption requires collection of consumption data from large number of meters. This is more complex if it involves the organizations in the network are geographically spread out. This coupled with multiple points of potential failure, lead to instances of missing and anomalous data due to unexpected behavior of the meters and other components within the system. With thousands of sensors sending data to a central repository, monitoring them in real time and identifying anomalous behavior is tedious. Further, a comprehensive Energy Management system would ideally also need to have capability of predicting energy consumption.

Therefore, there is a need to have a holistic solution that can: a) Identify missing data and substitute with suitable values (imputation). b) Automatically identify and report outliers and abnormal behavior of the changing data. These changes are not normal occurrences but noise or information that require special attention. c) Use past consumption patterns to predict future consumption.

In the current art various solutions are available for the above needs however these technologies and solutions suffer from inherent problems including requirement of Manual calibration from individuals having with domain expertise, Scalability Challenges for large stage implementation. Also the existing solutions provide only non-unified approach.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for outlier detection, anomalous behavior detection, missing data imputation and prediction of consumption in energy data for one or more energy sensors by using a unified model.

The present application provides a computer implemented method for outlier detection, anomalous behavior detection, missing data imputation and prediction of consumption in energy data for one or more energy sensors by using a unified model. The method comprises processor implemented steps of collecting a time series data to be used as training data using a data collection module (210), wherein the time series data is generated and modeled according to a preferred interval. Next the unified model is trained using the collected time series data to enable computation of a plurality of parameters using a model training module (212) wherein the plurality of parameters are computed by implementing statistical machine learning techniques on the collected time series data, and the trained unified model is used to implement the plurality of parameters on a new data of energy consumption by a model implementation module (214) wherein the plurality of parameters are used perform at least one from a group of outlier detection, anomaly detection, missing data imputation and prediction of consumption in energy data.

In another aspect, a system (102) for outlier detection, anomalous behavior detection, missing data imputation and prediction of consumption in energy data for one or more energy sensors by using a unified model comprising a processor (202), a memory (204), operatively coupled with said processor is disclosed. The system comprises a data collection module (210) configured to collect a time series data to be used as training data, wherein the time series data is generated and modeled according to a preferred interval. Further the disclosed system (102) comprises a model training module (212) configured to train the unified model using the collected time series data to enable computation of a plurality of parameters wherein the plurality of parameters are computed by implementing statistical machine learning techniques on the collected time series data. The disclosed system further comprises a model implementation module (214) configured to implement, using the trained unified model, the plurality of parameters on a new data of energy consumption wherein the plurality of parameters are used perform at least one from a group of outlier detection, anomaly detection, missing data imputation and prediction of consumption in energy data.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

Figure 1:
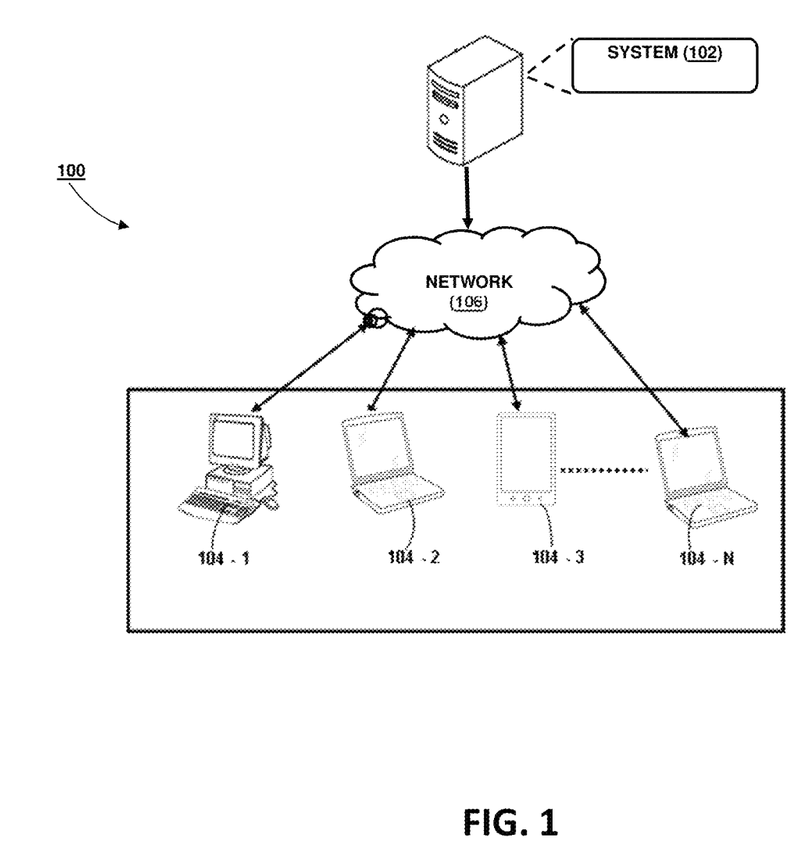
FIG. 1: illustrates a network implementation of a system for outlier detection, anomalous behavior detection, missing data imputation and prediction of consumption in energy data for one or more energy sensors by using a unified model, in accordance with an embodiment of the present subject matter.

The present application provides a computer implemented method and system for outlier detection, anomalous behavior detection, missing data imputation and prediction of consumption in energy data for one or more energy sensors by using a unified model. Referring now to FIG. 1, a network implementation 100 of a system 102 for outlier detection, anomalous behavior detection, missing data imputation and prediction of consumption in energy data for one or more energy sensors by using a unified model is illustrated, in accordance with an embodiment of the present subject matter. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. In another embodiment, it may be implemented as custom built hardware designed to efficiently perform the invention disclosed. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
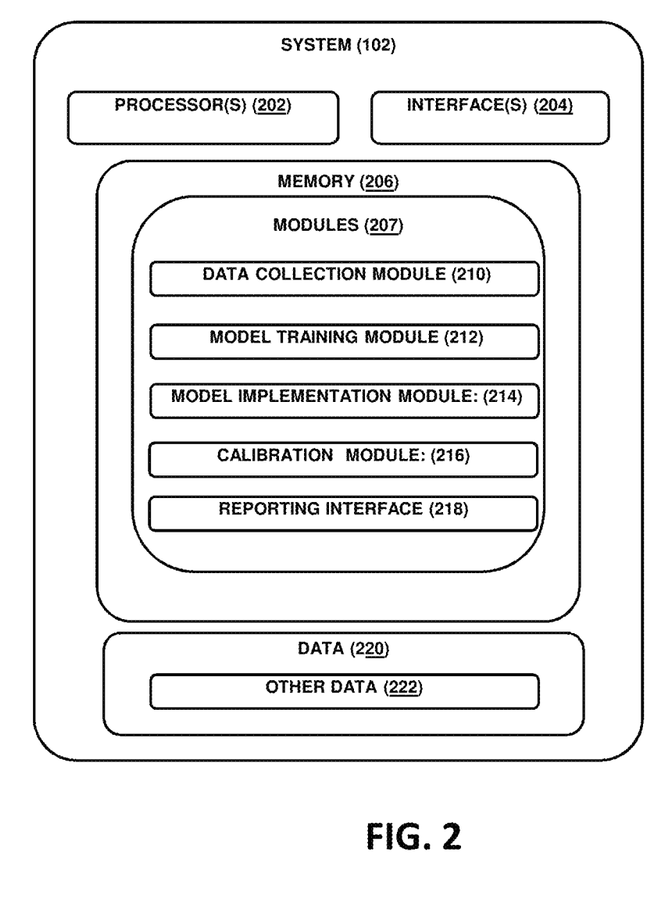
FIG. 2: shows block diagrams illustrating the system for outlier detection, anomalous behavior detection, missing data imputation and prediction of consumption in energy data for one or more energy sensors by using a unified model, in accordance with an embodiment of the present subject matter.

In one embodiment the present invention, referring to FIG. 2, describes a detailed working of the various components of the system 102.

In an aspect a system (102) for outlier detection, anomalous behavior detection, missing data imputation and prediction of consumption in energy data for one or more energy sensors by using a unified model comprising a processor (202), a memory (204), operatively coupled with said processor is disclosed. The system comprises a data collection module (210) configured to collect a time series data to be used as training data, wherein the time series data is generated and modeled according to a preferred interval. Further the disclosed system (102) comprises a model training module (212) configured to train the unified model using the collected time series data to enable computation of a plurality of parameters wherein the plurality of parameters are computed by implementing statistical machine learning techniques on the collected time series data. The disclosed system further comprises a model implementation module (214) configured to implement, using the trained unified model, the plurality of parameters on a new data of energy consumption wherein the plurality of parameters are used perform at least one from a group of outlier detection, anomaly detection, missing data imputation and prediction of consumption in energy data.

In another aspect the disclosed system (102) further comprises a calibration module (216) configured to calibrate the one or more energy sensors based on the implementation of the trained model on the new data of energy consumption. In yet another aspect the disclosed system (102) may further comprise a reporting interface (218) configured to report outlier detection, anomalous behavior detection, missing data imputation and prediction of consumption in energy data for one or more energy sensor. Further the system disclosed herein is such that plurality of parameters are saved in a database such that the database is updated periodically to implement the data.

The instant invention is a system that learns the normal patterns at all levels of energy sensors in a network and uses this knowledge to (1) identify anomalies, (2) substitute missing data and (3) prediction of in energy consumption. Further the disclosed system keeps the information in a persistent storage/database which may be stored as a window while comparing with the actual consumption that arrives in the system, on a near-real time basis. The system utilizes this information to generate timely alerts and warnings to take appropriate actions.

Regular re-training of the system based on the action taken determines new normals and thresholds thus making the system self-optimizing. The disclosed system acts as one solution to solve all the data related problems by reducing computation, training, modelling efforts and complexity of the system.

In an aspect the system is used to understand the normal usage patterns of energy data at all levels of the network hierarchy. In a practical scenario, a building will have several energy sensors connected to meters at different levels for different appliances. It is difficult and time consuming to trace which of these sensors connected to thousands of energy meters are having anomalous behavior.

The invention identifies the regular consumption patterns based on hour of the day of a week. Another aspect identifies any energy usage more than a specified threshold to raise an alert in the system. Further, it can identify any appliance started accidentally or unusually by correlating the time factor and usage. With the help of timely alerts and proper actions taken, the consumption pattern is expected to get optimized over time. Periodic re-training of the system makes the patterns more stable, thus making it a self-learning, closed-loop system that requires no manual intervention. In an embodiment the system is configured to calibrate sensors and reports their anomalous behavior so that appropriate actions can be taken at the right time.

Figure 3:
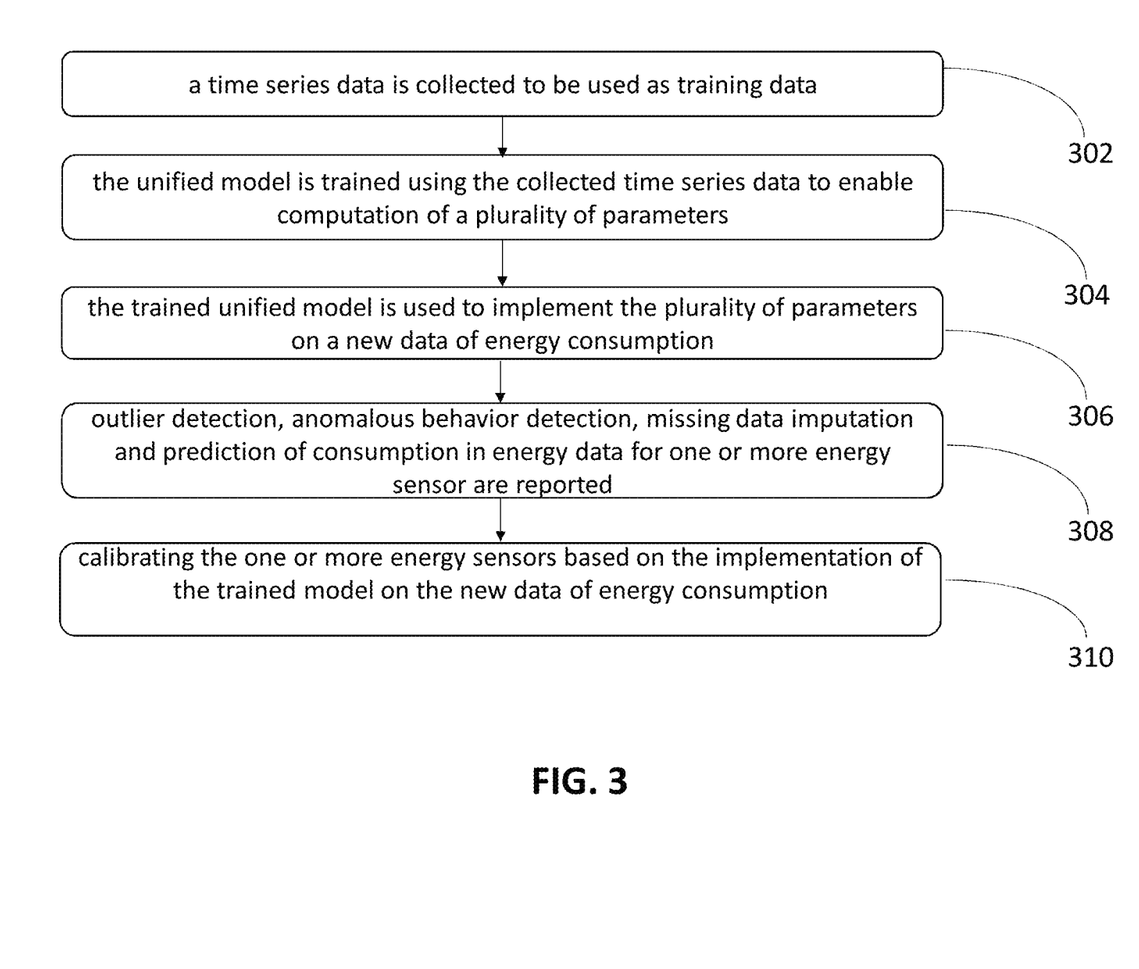
FIG. 3: shows a flowchart illustrating the method for outlier detection, anomalous behavior detection, missing data imputation and prediction of consumption in energy data for one or more energy sensors by using a unified model, in accordance with an embodiment of the present subject matter.

Referring now to FIG. 3 a flow chart illustrating the method for outlier detection, anomalous behavior detection, missing data imputation and prediction of consumption in energy data for one or more energy sensors by using a unified model is shown. The process starts at step 302 where a time series data is collected to be used as training data using a data collection module (210). In an aspect the time series data is generated and modeled according to a preferred interval.

At the step 304, the unified model is trained using the collected time series data to enable computation of a plurality of parameters using a model training module (212). According to an aspect the plurality of parameters are computed by implementing statistical machine learning techniques on the collected time series data.

Next at the step 306 the trained unified model is used to implement the plurality of parameters on a new data of energy consumption by a model implementation module (214) wherein the plurality of parameters are used perform at least one from a group of outlier detection, anomaly detection, missing data imputation and prediction of consumption in energy data.

The disclosed method may also comprise the step 308 outlier detection, anomalous behavior detection, missing data imputation and prediction of consumption in energy data for one or more energy sensor are reported using a reporting interface (218)

Further, the method may also include the step 306 wherein the one or more energy sensors based on the implementation of the trained model on the new data of energy consumption using a calibration module (216).

In an embodiment the disclosed method may further include calibrating the one or more energy sensors based on the implementation of the trained model on the new data of energy consumption as illustrated at the step 310

The following paragraphs contain illustration of the use of an embodiment of the disclosed invention which are intended for the purpose of illustrating the working of the invention. However it will be clear to a person skilled in the art that the instant invention may be implemented in various other modes. The following paragraphs therefore are in no way meant to limit the scope of the instant invention which is limited only by the following claims.

In an example the system is trained on historical data that has been classified to learn patterns at each hour of a day forming 168 week hour data points for each sensor. A non-parametric statistical machine learning technique that uses the Inter Quartile Ranges is implemented to calculate normal consumption ranges and thresholds for each of these data points. Different levels of thresholds, based on the appliance the sensor is connected to, can be set to capture minor deviations in the usage to major ones. This is implemented using the Inter Quartile Ranges (IQR) that is not affected by outlier data present in the training set. The Q3+−m (IQR) helps in identifying spikes and abnormalities in energy consumption as well as accidental change of schedules in starting appliances. The scalar m can be a user-defined value or a learnt value as a result of training. The thresholds can be identified at different levels of hierarchy. This can also combined with other factors like occupancy to get thresholds or patterns for usage per occupant thus giving more precise levels of consumption. This is very effective in setting alerts and warnings automatically.

Using the data points that give general pattern for a sensor, it can be combined with most recent n time series windows to predict future usage. A correlation factor is deduced to identify which level of threshold or quartile, the selected time series fall in. Based on the correlation factor, appropriate weights are given to each of the time series selected along with the thresholds and a prediction is made for the future days. Prediction can be made for one week in advance with an interval granularity ranging from minutes, hours, day or week. The same technique can be used for imputing missing data.

Figure 4:
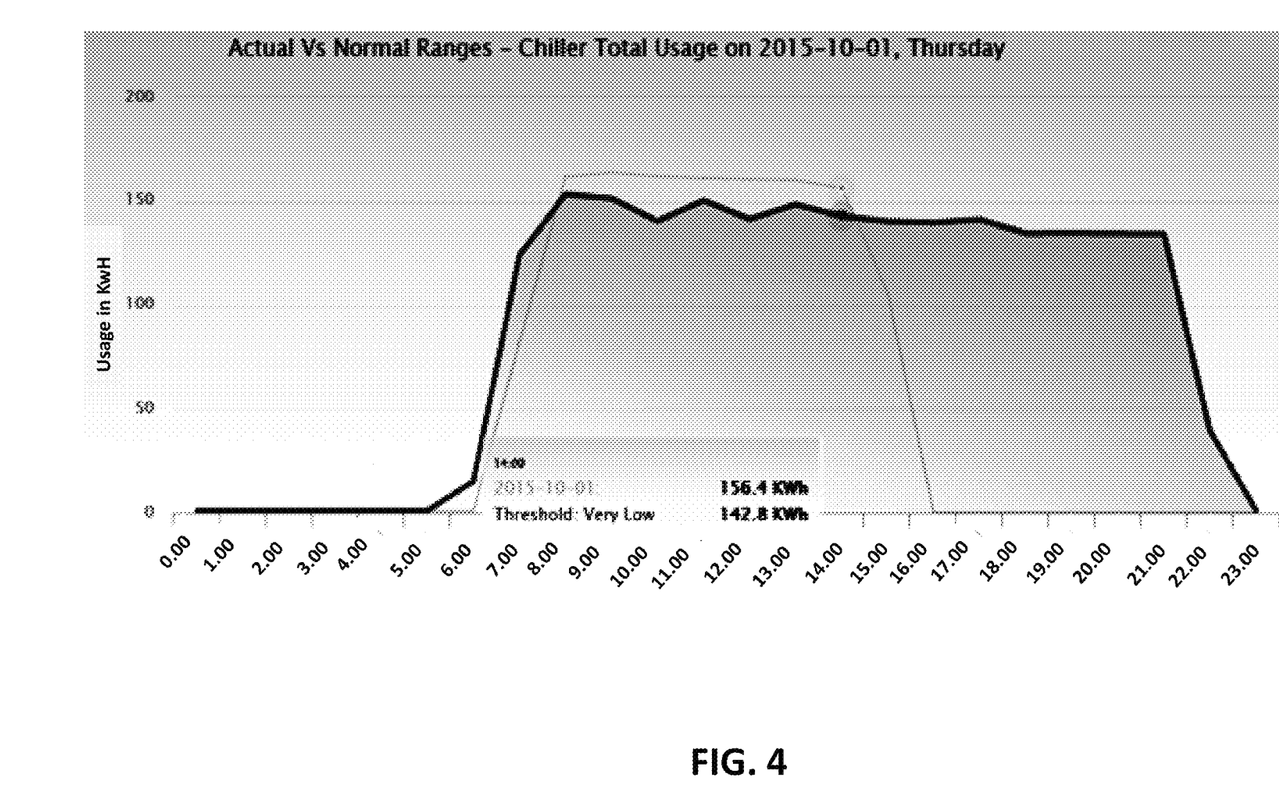
FIG. 4: shows anomalies in energy Consumption on an hourly basis, in accordance with an embodiment of the present subject matter.
Figure 5:
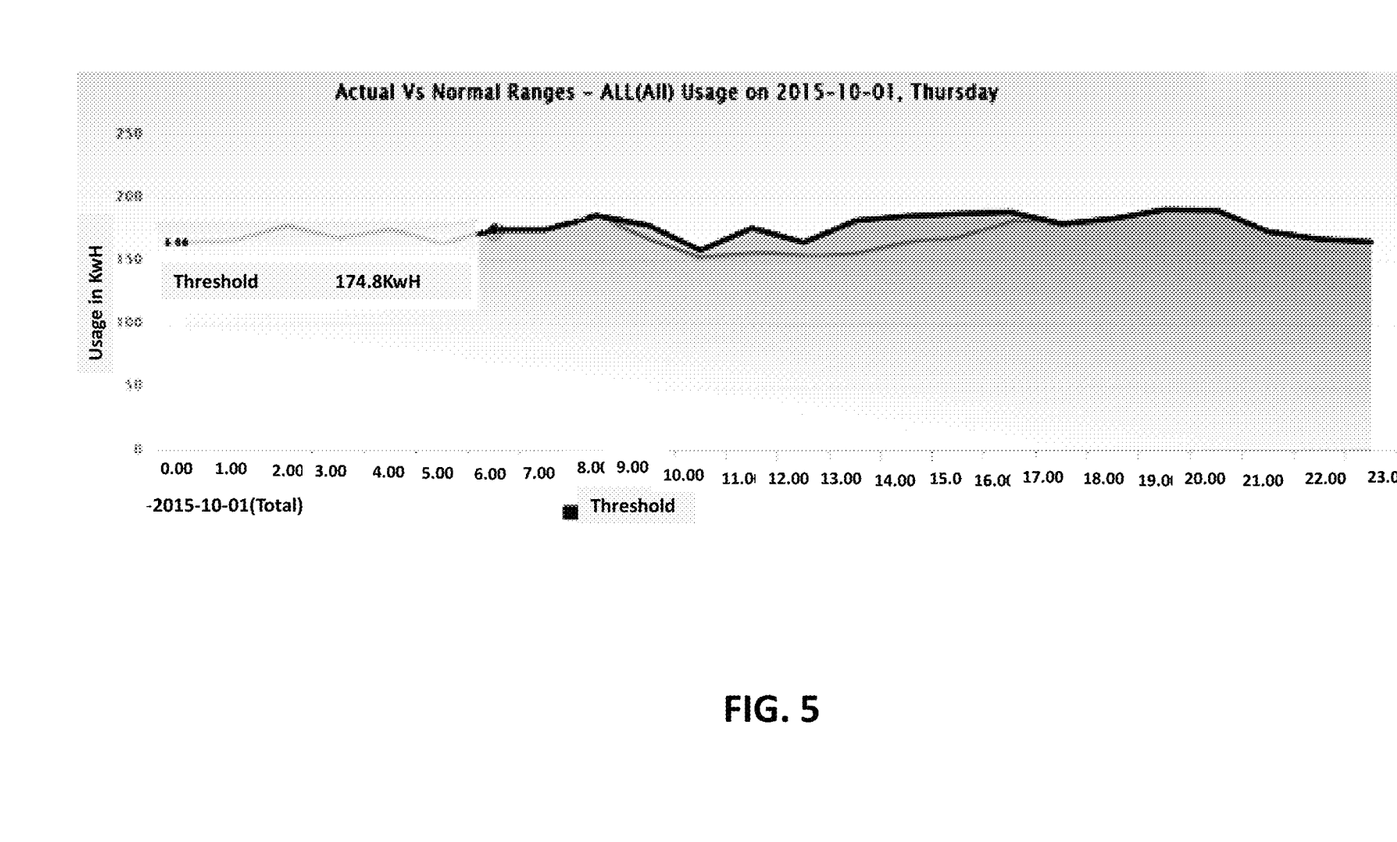
FIG. 5: shows Imputed data using the thresholds generated by the unified model in accordance with an embodiment of the present subject matter.

Experiment to demonstrate the working of the instant system and method have been performed, FIG. 4 and FIG. 5 shows the results of the performed experiment wherein the experimental data shown if for energy consumption on the first day of October 2015. Referring to FIG. 4 a graph illustrating the anomalies in energy Consumption on an hourly basis is shown. In FIG. 4 the shaded region is the threshold and Line chart is the actual consumption.

Figure 6:
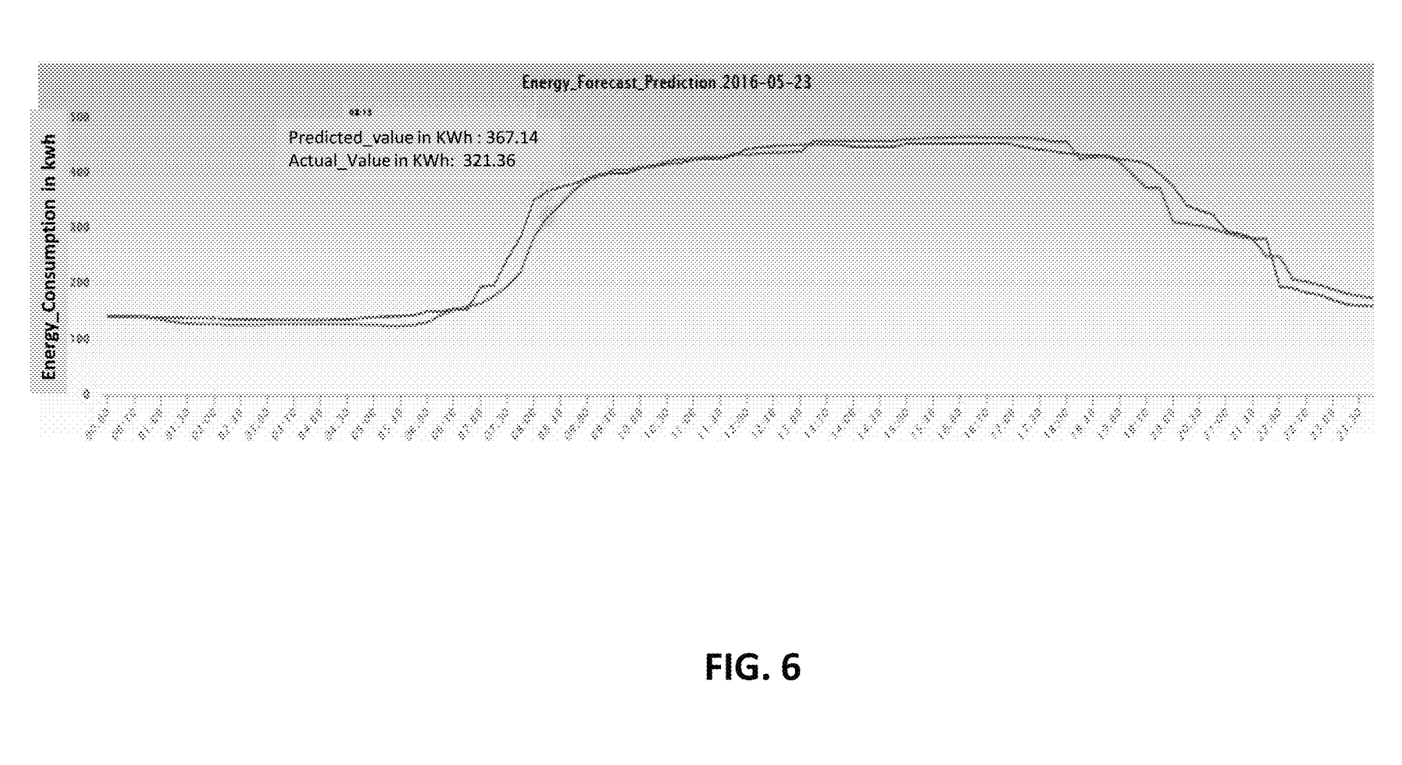
FIG. 6: shows a predictions based on the model for 15 minutes interval of the day in accordance with an embodiment of the present subject matter.

Referring to FIG. 5 a graph illustrating the imputation of data using the threshold generated by the unified model. The illustrated graph of FIG. 5 shows imputed data between 6:00 AM and 8:00 AM which is imputed using the calculated thresholds. Referring now to FIG. 6 a graph illustrating the energy consumption prediction vs. the actual energy consumption is shown. The graph in FIG. 6 clearly illustrates the accuracy in prediction of the current model. The prediction for FIG. 6 is done for the twenty third day of May 2016.

We claim:

1. A method for outlier detection, anomalous behavior detection, missing data imputation and prediction of consumption in energy data for one or more energy sensors by using a unified model, said method comprising processor implemented steps of:
    collecting a time series data to be used as training data, wherein the time series data is generated and modeled according to a preferred interval;
    training the unified model using the collected time series data to enable computation of a plurality of parameters, wherein the plurality of parameters are computed by implementing statistical machine learning techniques on the collected time series data, wherein the statistical machine learning techniques uses Inter Quartile Ranges (IQR) to calculate normal consumption ranges and thresholds for each data points, wherein the thresholds are identified at different levels of hierarchy and combined with occupancy to obtain patterns for usage per occupant for providing precise levels of consumption, and wherein the unified model is periodically re-trained to stabilize the patterns, making the unified model self-learning and self-optimizing; and
    implementing using the trained unified model the plurality of parameters on a new data of energy consumption, wherein the plurality of parameters are used to perform the outlier detection, anomaly detection, missing data imputation and prediction of consumption in energy data.

2. The method according to claim 1, further comprising calibrating the one or more energy sensors based on the implementation of the trained unified model on the new data of energy consumption.

3. The method according to claim 1, further comprising reporting the outlier detection, anomalous behavior detection, missing data imputation and prediction of consumption in energy data for the one or more energy sensors.

4. The method according to claim 1, wherein the plurality of parameters are saved in a database such that the database is updated periodically to implement the data.

5. The method according to claim 1, wherein the collected time series data used as training data is un-cleaned data.

6. A system (102) for outlier detection, anomalous behavior detection, missing data imputation and prediction of consumption in energy data for one or more energy sensors by using a unified model, the system comprising:
    a processor (202),
    a memory (204), operatively coupled with said processor, wherein the processor is configured to:
    collect a time series data to be used as training data, wherein the time series data is generated and modeled according to a preferred interval;
    train the unified model using the collected time series data to enable computation of a plurality of parameters wherein the plurality of parameters are computed by implementing statistical machine learning techniques on the collected time series data, wherein the statistical machine learning techniques uses Inter Quartile Ranges (IQR) to calculate normal consumption ranges and thresholds for each data points, wherein the thresholds are identified at different levels of hierarchy and combined with occupancy to obtain patterns for usage per occupant for providing precise levels of consumption, and wherein the unified model is periodically re-trained to stabilize the patterns, making the unified model self-learning and self-optimizing; and
    implement, using the trained unified model, the plurality of parameters on a new data of energy consumption wherein the plurality of parameters are used to perform the outlier detection, anomaly detection, missing data imputation and prediction of consumption in energy data.

7. The system according to claim 6, further comprising calibrating the one or more energy sensors based on the implementation of the trained unified model on the new data of energy consumption.

8. The system according to claim 6, further comprising reporting the outlier detection, anomalous behavior detection, missing data imputation and prediction of consumption in energy data for the one or more energy sensors.

9. The system according to claim 6, wherein the plurality of parameters are saved in a database such that the database is updated periodically to implement the data.

10. One or more non-transitory machine readable information storage mediums comprising one or more instructions which when executed by one or more hardware processors cause:
    collecting a time series data to be used as training data using a data collection module (210), wherein the time series data is generated and modeled according to a preferred interval;
    training a unified model using the collected time series data to enable computation of a plurality of parameters, wherein the plurality of parameters are computed by implementing statistical machine learning techniques on the collected time series data, wherein the statistical machine learning techniques uses Inter Quartile Ranges (IQR) to calculate normal consumption ranges and thresholds for each data points, wherein the thresholds are identified at different levels of hierarchy and combined with occupancy to obtain patterns for usage per occupant for providing precise levels of consumption, and wherein the unified model is periodically re-trained to stabilize the patterns, making the unified model self-learning and self-optimizing; and implementing using the trained unified model the plurality of parameters on a new data of energy consumption, wherein the plurality of parameters are used to perform the outlier detection, anomaly detection, missing data imputation and prediction of consumption in energy data.

11. The one or more non-transitory machine readable information storage mediums of claim 10, wherein the one or more instructions which when executed by the one or more hardware processors further cause calibrating the one or more energy sensors based on the implementation of the trained unified model on the new data of energy consumption using a calibration module (216).

12. The one or more non-transitory machine readable information storage mediums of claim 10, wherein the one or more instructions which when executed by the one or more hardware processors further cause reporting the outlier detection, anomalous behavior detection, missing data imputation and prediction of consumption in energy data for the one or more energy sensors.

13. The one or more non-transitory machine readable information storage mediums of claim 10, wherein the plurality of parameters are saved in a database such that the database is updated periodically to implement the data.

14. The one or more non-transitory machine readable information storage mediums of claim 10, wherein the collected time series data used as training data is un-cleaned data.

* * * * *